United States Patent [19]

Isely

[11] Patent Number: 4,611,863
[45] Date of Patent: Sep. 16, 1986

[54] MAGNETICALLY SUPPORTED AND TORQUED MOMENTUM REACTION SPHERE

[75] Inventor: William H. Isely, Clearwater, Fla.

[73] Assignee: Honeywell Inc., Minneapolis, Minn.

[21] Appl. No.: 516,819

[22] Filed: Jul. 25, 1983

[51] Int. Cl.$^4$ .............................................. F16C 39/06
[52] U.S. Cl. ................................. 310/90.5; 74/5.46; 244/177
[58] Field of Search ................. 308/10; 74/5.42, 5.46, 74/5.47; 73/517; 244/176, 177

[56] References Cited

U.S. PATENT DOCUMENTS

| | | | |
|---|---|---|---|
| 3,252,340 | 5/1966 | Watt | 74/5.46 |
| 3,508,445 | 4/1970 | Penney, Jr. et al. | 308/10 |
| 3,845,996 | 11/1974 | Geweke | 308/10 |
| 3,954,024 | 5/1976 | Statts | 308/10 |
| 4,078,436 | 3/1978 | Statts | 308/10 |
| 4,245,869 | 1/1981 | Scheffer | 308/10 |
| 4,393,710 | 7/1983 | Bernard | 308/10 |

*Primary Examiner*—R. Skudy
*Attorney, Agent, or Firm*—George W. Field

[57] ABSTRACT

Angular momentum exchange apparatus comprising, in combination: a massive rotor of substantially spherical configuration having at least an outer surface of electrically conductive and magnetizable material; a housing for the rotor; driving apparatus carried by the housing for cooperation with the surface to cause angular acceleration of the rotor about each of a plurality of axes; and means supporting said rotor in said housing for rotation free from contact there between.

2 Claims, 5 Drawing Figures

MAGNETICALLY SUPPORTED AND TORQUED MOMENTUM REACTION SPHERE

BACKGROUND OF THE INVENTION

An accepted way to control the attitude of a vehicle in space is the use of a momentum wheel. Typically this comprises a balanced body mounted for rotation about an axis in the vehicle, and having means for angularly accelerating or decelerating the body about the axis. By the general principles of momentum exchange theory, angular acceleration of the body about the axis in one direction results in angular acceleration of the vehicle about the axis in the opposite direction. Since the mass of the body is much less than the mass of the vehicle, a considerable acceleration of the body is required to produce a significant acceleration of the vehicle, but a considerable change in vehicle attitude about the axis can be produced, although quite slowly, by accelerating the body and then maintaining it in operation at the accelerated rate.

As long as the body continues to turn at a constant angular velocity, including but not limited to zero, the vehicle itself continues in its then angular velocity. When the vehicle has assumed a desired new attitude, deceleration of the body to zero results in deceleration of the vehicle to zero, and the newly achieved attitude is maintained.

In the real world, there are external torques due to the slight drag in the "vacuum" of space, as well as to the "light pressure" from the sun. There may also be rotating machinery aboard which accelerates or decelerates to produce unwanted torques of the vehicle. Over a period of time, to counter these torques, the momentum wheel will not typically be at zero angular speed for a space vehicle which is at zero angular speed, and means are accordingly provided for "dumping" angular momentum, by torquing magnetically on the Earth's magnetic field, for example.

It is customary to mount a momentum wheel with its axis of rotation aligned with one of the major axes of the vehicle, arbitrarily defined as X-, Y-, and Z-axes. By this means it is possible to bring the vehicle to any desired position about the axis of the momentum wheel. If it is desired to be able to bring the vehicle to any desired attitude in space, it is possible to provide multiple momentum wheels, rotatable about additional axes which may or may not be perpendicular to each other and to the first axis. By acceleration and deceleration of the wheels in sequence, it is possible to bring the vehicle to its desired position in steps, which however might be a somewhat protracted procedure.

In practice it is desirable to accelerate more than one wheel at the same time, to reduce the length of time required to bring the vehicle to a desired position, and for continuous attitude control this is essential. This, however, introduces a disturbing factor. A spinning momentum wheel acts as a gyroscope, and when it is attempted to give to a vehicle, having a first wheel spinning about a first axis, an acceleration about a second axis, by use of a second momentum wheel, the gyroscopic torques produced by the two wheels interact in a way known as cross coupling between the axes, compensation for which is required, but is generally not complete.

Another characteristic of momentum wheels rotating about multiple axes is that perfect balance with conventional support means, i.e., bearings, is not achieved, and the rotation of the unbalanced momentum wheels induces vibration disturbances into the vehicle body. Also conventional bearings have wear and life problems which limit the useful lifetimes of the vehicles in which they are installed.

Significant efforts have been made to isolate the momentum wheel vibration disturbances and increase the life of the single axis momentum wheels by using magnetically supported wheel bearings. This requires radial support in two directions and axial support in a third which is not symmetrical. Rotation of the spacecraft in which such a single axis magnetically supported momentum wheel is rotating results in significant gyroscopic loads on the magnetic support bearings. So far a practical single axis magnetically supported momentum wheel has not been produced.

BRIEF SUMMARY OF THE INVENTION

The present invention comprises a momentum exchange arrangement in which a single rotating body may be used to change the attitude of the vehicle in any direction without the possibility of any disturbing cross coupling torques, without any touching moving parts to cause wearout, and with a completely symmetrical magnetic support system which eliminates the complexities of past single axis magnetic support systems.

This is accomplished by use of a single spherical "wheel" magnetically mounted in a spherical housing without physical contact with the housing, together with plural torquing means acting singly or jointly on the sphere to change its axis of rotation without cross coupling between the effective axes of the torquing means, or causing gyroscopic torques on the spacecraft or the magnetic support system.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawings, in which like reference numerals identify corresponding parts in the several views.

DESCRIPTION OF THE PREFERRED EMBODIMENT

Figure 1:
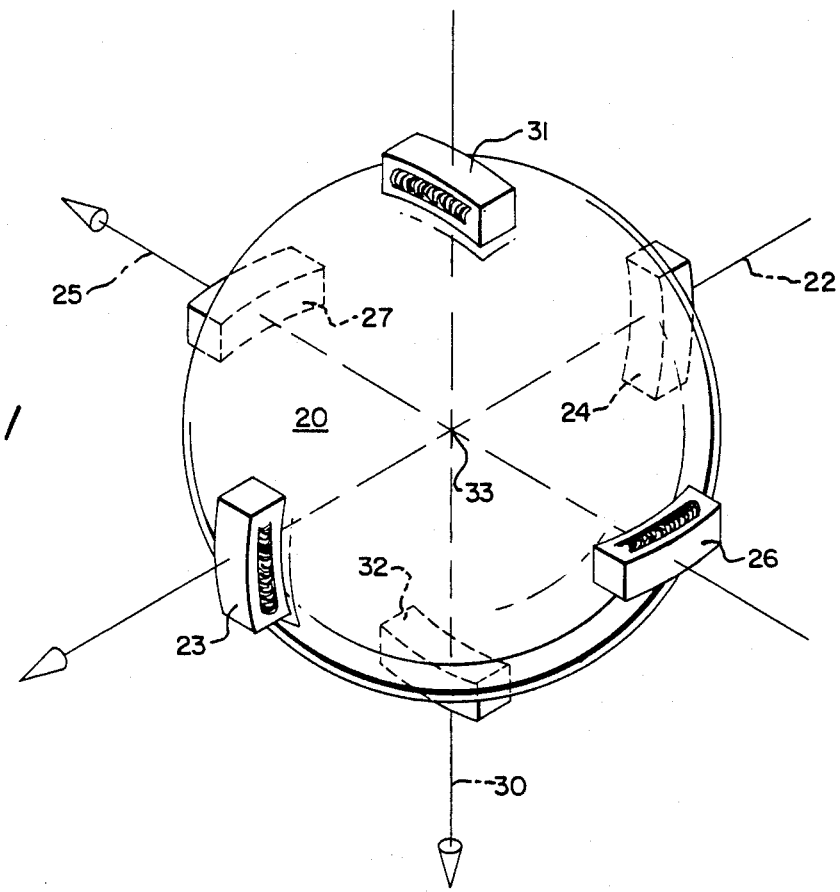
FIG. 1 is a somewhat schematic showing of a momentum wheel according to the invention.

Turning now to FIG. 1, a momentum exchange device according to the invention is shown to comprise a massive spherical body 20 having at least an outer layer which is both an electrical conductor and a magnetizable material.

Body 20 is enclosed in a housing 21 which may be a concentric spherical shell. Mounted at the ends of a first diameter 22 of the body are a pair of sectors 23 and 24 presently to be described. Mounted at the ends of a second diameter 25 are sectors 26 and 27, and mounted at the ends of a third diameter 30 are sectors 31 and 32. Diameters 22, 25, and 30 are orthogonal at the center 33 of body 20, and housing 21 may contain a liquid 34 in which body 20 has essentially zero buoyancy.

Figure 3:
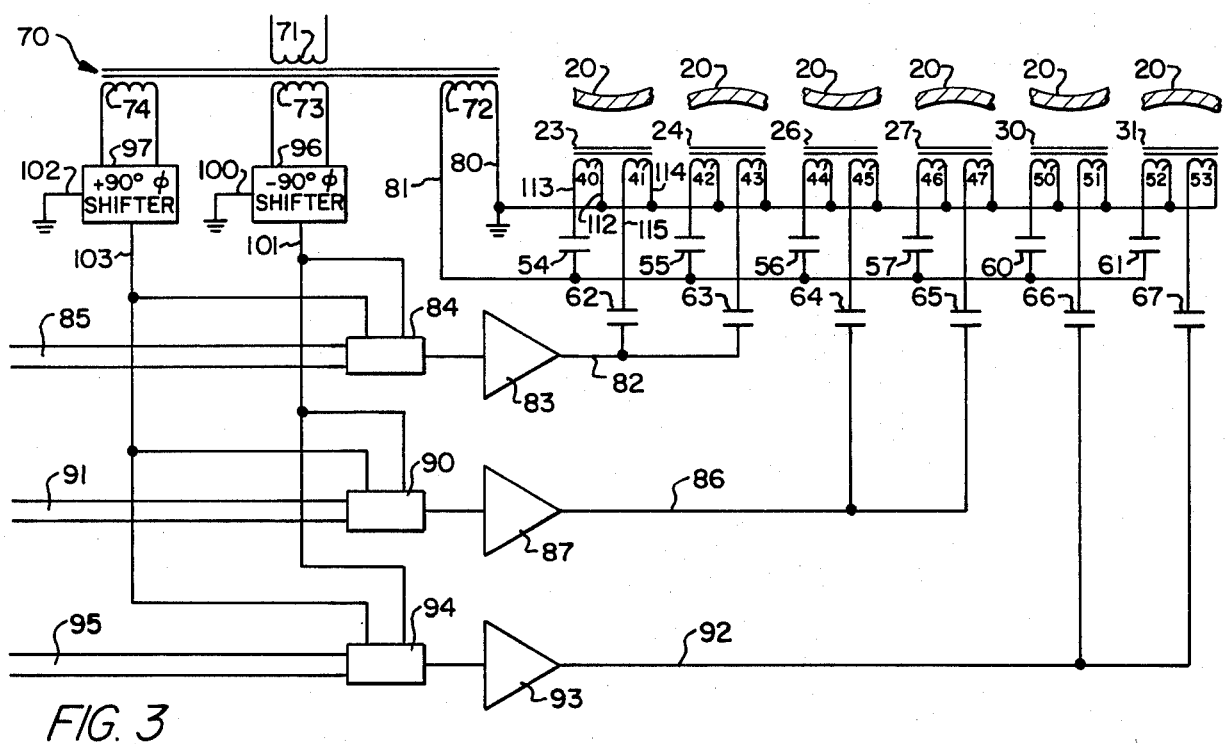

Each sector comprises an arcuate set of laminations carrying a centering winding and a torquing winding. Thus in FIGS. 1 and 3, sector 23 comprises centering winding 40 and torquing winding 41 and sector 24 comprises centering winding 42 and torquing winding 43. Similarly sector 26 comprises centering winding 44 and torquing winding 45, sector 27 comprises center winding 46 and torquing winding 47, sector 30 comprises centering winding 50 and torquing winding 51, and sector 31 comprises centering winding 52 and torquing winding 53. Each centering winding has in series with it a capacitor: thus windings 40, 42, 44, 46, 50 and 52 are associated with capacitors 54, 55, 56, 57, 60 and 61 respectively. Similarly each torquing winding has a capacitor in series with it; thus windings 41, 43, 45, 47, 51 and 53 are associated with capacitors 62, 63, 64, 65, 66 and 67 respectively.

The sectors are energized with alternating voltage of a desired frequency, such as 600 Hertz, from a source such as a transformer 70 having a primary winding 71, a centering winding 72 and a set of torquing windings 73 and 74. Winding 72 has a first grounded conductor 80 to which are connected first terminals of all of winding 40-53, and a second conductor 81 to which are connected capacitors 54-61 inclusive.

Capacitors 62 and 63 are connected to the output conductor 82 of an amplifier 83 energized from a controller 84 in accordance with a reversing input signal 85, capacitors 64 and 65 are connected to the output conductor 86 of amplifier 87 energized from a controller 90 in accordance with a second reversing input 91, and capacitors 66 and 67 are energized from the output conductor 92 of an amplifier 93 energized from a controller 94 in accordance with a reversing input signal 95. The controllers derive their energization from transformer windings 73 and 74 through a ninety-degree retarding phase shifter 96 and a ninety-degree advancing phase shifter 97 respectively: phase shifter 96 has a grounded terminal 100 and an output conductor 101 connected to controllers 84, 90 and 94, and phase shifter 97 has a grounded terminal 102 and an output terminal 103 connected to controllers 84, 90 and 94.

It is understood that, if desired, a computer may be provided to supply the controller inputs of members 85, 91, and 95 under appropriate software control.

Figure 4:
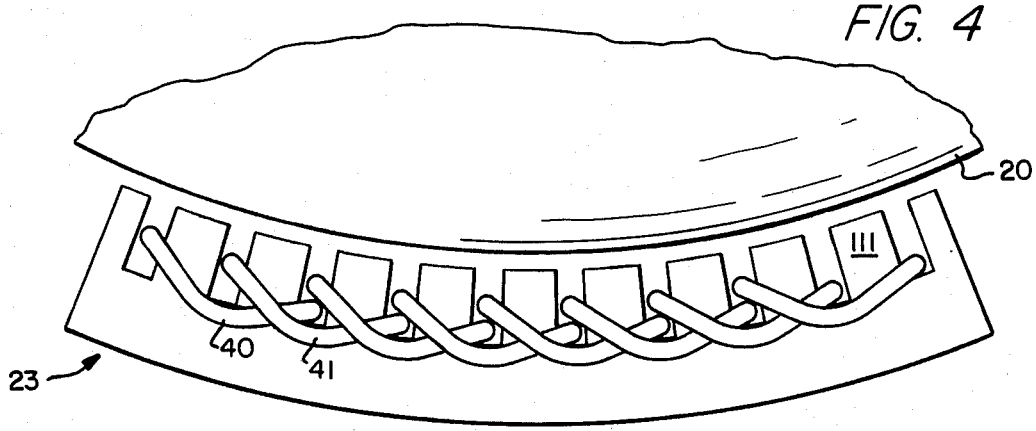
FIGS. 4 and 5 are fragmentary showings of a portion of FIG. 1.
Figure 5:
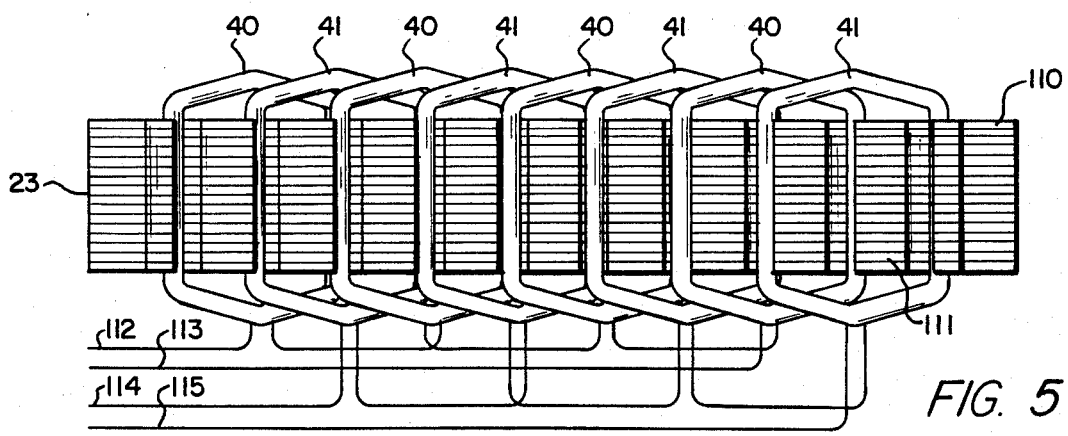

Sectors 23, 24, 26, 27, 30 and 31 are of identical construction, as shown in FIGS. 4 and 5. Each sector comprises a set of laminations 110 having an internal convex arcuate surface, of slightly larger diameter than that of body 20, defined by a plurality of salient poles 111 carrying the centering and torquing windings. Thus, sector 23 carries centering winding 40, connected by conductors 112 and 113 to ground conductor 80 and to capacitor 54, and torquing winding 41 connected by conductors 114 and 115 to ground conductor 80 and to capacitor 62.

OPERATION

The operation of my momentum exchange system will now be explained. Housing 21 is installed in the vehicle with its axes 22, 25 and 30 aligned with the arbitrary axes of the vehicle, and electrical energization is supplied from transformer winding 72 to sectors 23, 24, 26, 27, 31 and 32.

Centering of body 20 is accomplished by automatic regulation of the current in centering windings of the sectors as the inner spherical body moves off center, varying the gaps between the sectors and the sphere. When the sphere is properly centered in the housing, the inductive reactances of the centering windings have known values, which increase if the gaps become smaller and decrease if the gaps become larger. The capacitances of capacitors 54-61 are selected so that when the sphere is centered, and all the gaps are equal, each capacitive reactance is slightly less than that required for resonance with the inductive reactance of the associated centering winding. The sectors thus act in pairs to center the sphere along three mutually perpendicular axes. If the sphere moves so that it approaches the housing, so as to reduce the gap at one sector, it recedes from the opposite sector, increasing the inductance of the first centering and decreasing the inductance of the second. The tuned circuit for the sector at the increasing gap approaches more nearly the resonant condition, increasing the current in this centering winding, and thus increasing the magnetic force attracting the sphere to the sector. The circuit for the opposite sector is detuned by a greater amount than formally, decreasing the current in and according the force produced by the sector. A net force directed along the axis of the two sectors and proportional to the off-center displacement, recenters the sphere.

Rotation of the spherical body in this unit is accomplished by what can be considered a three-axis torque motor. The magnetic centering system just described uses a centering winding in each sector to produce centering force. With the addition of a torquing winding to each sector, the magnetic support elements are utilized as segments of a torque motor which can produce bi-directional torques about three orthogonal axes.

Each pair of opposing sectors is oriented to torque the sphere about one of the three mutually perpendicular axes of the housing. The forces acting to produce the torque result from the interplay of eddy currents, induced in the sphere by the magnetic flux of the centering winding, reacting with fluxes produced by the torquing winding. All centering windings in the six sectors are excited by a fixed frequency voltage such as at 600 Hertz and 200 volts. The torquing windings are excited with the same frequency power, at voltages which lead or lag, by 90 degrees, the voltages on the centering windings. A leading voltage causes torque in one direction and a lagging voltage causes torque in the opposite direction. The process described above is similar to the well known eddy current motor.

If it is simply desired to control the direction of rotation of the body about an axis, it is necessary only to supply a control signal, as signal 85 to controller 84, to cause connection of either phase shifter 96 or phase shifter 97 to amplifier 83. The necessary control signal may be manual or condition responsive, as from a directional gyroscope or computer. Under these conditions the momentum wheel is either stationery, or accelerates in one sense or the other at a rate predetermined by the voltage of transformer 70.

If it is desired to do so, variation in the energization of a torquing winding may be produced, to vary the torque and the resulting acceleration or velocity of the spherical body. The variation in torquing energization may also be accomplished by manual or condition responsive means.

It will be apparent that two or three pair of sectors can be energized simultaneously, to cause torques resulting in rotation of body 20 about an axis oblique to the orthogonal axes of housing 21, and that this is accomplished without any cross-coupling effects.

From the above it will be evident that the invention comprises an angular momentum exchange system in which momentum is stored in a spherical body rotating in a spherical housing on supports which eliminate physical contact between the rotating mass and the housing, and thus enable torques to be applied to the body simultaneously about mutually perpendicular axes without introducing any cross-coupling effects.

Figure 2:
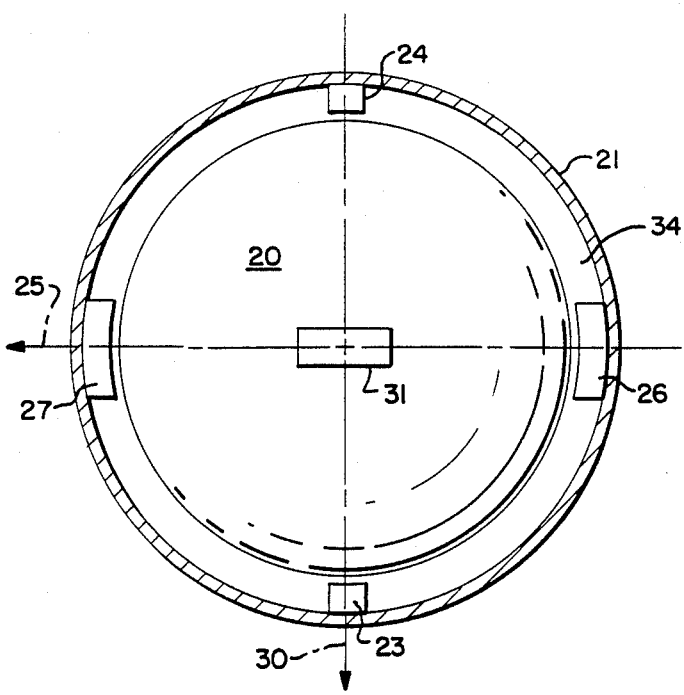
FIG. 2 is a sectional view of elements of FIG. 1, FIG. 3.is a circuit diagram of apparatus embodying the invention.

For high reliability in the event of a failure of any element except the spherical mass 20, and the housing 21, one or more redundant sets of magnetic sectors, drive amplifiers, supply transformers, controllers, and phase shifters can be mounted in the open spaces between elements shown in FIGS. 1 and 2.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. Angular momentum exchange apparatus comprising, in combination:
   a massive rotor of substantially spherical configuration having at least an outer surface of electrically conductive and easily magnetized material;
   a housing for said rotor;
   drive means carried by said housing for cooperation with said surface to cause angular acceleration of said rotor about each of a plurality of axes; and
   means supporting said rotor in said housing for rotation free from contact therebetween, the drive means and the last named means comprising a plurality of pairs of laminated sectors located at opposite ends of mutually orthogonal diameters of said housing, each sector carrying a centering winding and a torquing winding, the torquing windings being positionally related to the centering windings of the sectors of each pair so as to cause rotation of said rotor about a different one of said axis in either of two opposite directions depending on the phase relation between the voltages energizing said windings, and further comprising capacitors, in series with said centering windings, having capacitive reactances of said centering windings, at the frequency of energization thereof, when the rotor is centered in the house.

2. Angular momentum exchange apparatus comprising, in combination:
   a massive rotor of substantially spherical configuration having at least an outer surface of electrically conductive and easily magnetized material;
   a housing for said rotor;
   drive means carried by said housing for cooperation with said surface to cause angular acceleration of said rotor about each of a plurality of axes; and
   means supporting said rotor in said housing for rotation free from contact therebetween, the drive means comprising a plurality of pairs of laminated sectors located at opposite ends of mutually orthogonal diameters of said housing, each sector carrying a centering winding and a torquing winding, the torquing windings being positionally related to the centering windings of the sectors of each pair so as to cause rotation of said rotor about a different one of said axes in either of two opposite directions depending on the phase relation between the voltages energizing said windings.

* * * * *